United States Patent [19]
Fedrigo

[11] 3,897,621
[45] Aug. 5, 1975

[54] METHOD OF MAKING A CAM LOCK

[76] Inventor: A. Fred Fedrigo, 35750 Industrial Rd., Livonia, Mich. 48150

[22] Filed: July 26, 1974

[21] Appl. No.: 492,190

[52] U.S. Cl. .................. 29/434; 29/453; 403/350
[51] Int. Cl.² ........................................ B23P 11/00
[58] Field of Search ............. 29/453, 434; 403/350

[56] References Cited
UNITED STATES PATENTS

| | | | |
|---|---|---|---|
| 2,432,059 | 12/1947 | Zipser | 403/350 |
| 2,687,831 | 8/1954 | Miller | 29/453 X |
| 3,259,407 | 7/1966 | Welt | 403/350 |
| 3,401,447 | 9/1968 | Knight | 29/453 X |
| 3,631,584 | 1/1972 | Walkup | 29/453 X |

Primary Examiner—Charlie T. Moon
Attorney, Agent, or Firm—Charles W. Chandler

[57] ABSTRACT

A method for making a two-piece cam lock suited for locking a pair of telescopically interfitting poles together at a selected overall length.

6 Claims, 7 Drawing Figures

PATENTED AUG 5 1975    3,897,621

METHOD OF MAKING A CAM LOCK

BACKGROUND OF THE INVENTION

This invention relates to means for locking a pair of telescopically interfitting poles together by twisting one pole with respect to another, and more specifically to a novel two-piece cam lock for such poles assembled by snapping the cam on a spindle integrally connected to a body member.

A telescopic pole assembly is often employed in swimming pools and the like where the user desires a pole having an adjustable overall length. Usually such poles employ a cam lock carried in such a manner that by twisting an inner pole with respect to an outer pole, in one direction, the cam locks the two poles together. To release the poles, they are twisted in the opposite direction.

A conventional cam lock comprises a cam rotatably carried on a body by means of an elongated metal fastener. One problem with such an arrangement is that the metal fastener often becomes corroded through contact with swimming pool chemicals. In addition, the conventional commercial cam lock requires at least three pieces which must be assembled together.

SUMMARY OF THE INVENTION

The broad purpose of the present invention is to provide a two-piece cam lock having a spindle, on which the cam rotates, integrally attached to the body of the lock. Preferrably both pieces are formed of non-corroding plastic material. In the preferred embodiment of the invention, the spindle is tapered to form an annular shoulder for receiving the cam. The cam is mounted on the spindle by being seated on the tapered portion of the cam and then being pressed such that the spindle-receiving opening in the cam is slightly expanded to allow the cam to be snapped over the shoulder. When the cam is snapped past the shoulder, it prevents the cam from being removed from the spindle.

Accordingly, the preferred two-piece cam lock requires a minimum number of components. In addition, it can be easily assembled to form a reliable locking device.

These and still further objects of the invention will become apparent to those skilled in the art to which the invention pertains upon reference to the following detailed description.

DESCRIPTION OF THE DRAWINGS

The description refers to the accompanying drawing, in which like reference characters refer to like parts throughout the several views, and in which.

DESCRIPTION OF THE PREFERRED EMBODIMENT

Figure 1:
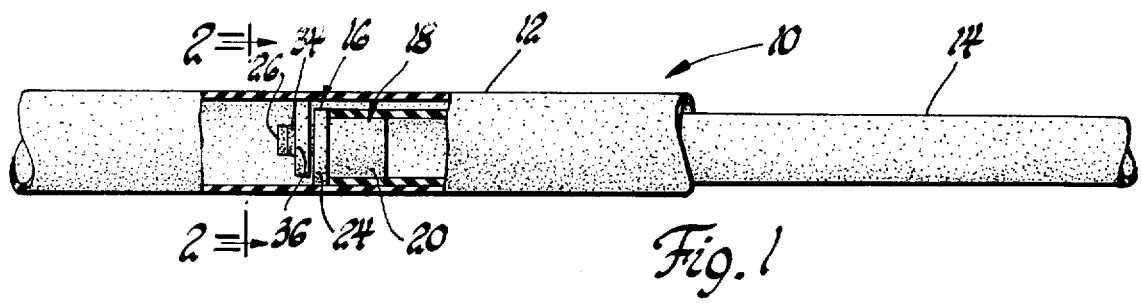
FIG. 1 is a sectional fragmentary view of a pair of telescopically interfitting poles having a cam lock illustrating the preferred embodiment of the invention locking the poles at a selected overall length.
Figure 2:
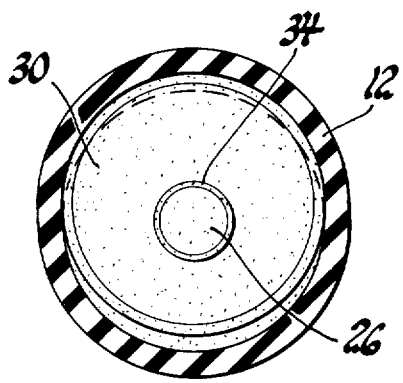
FIG. 2 is an enlarged view taken along lines 2—2 of FIG. 1.

Now referring to the drawing, a telescopic pole assembly 10 is illustrated in FIG. 1 as comprising a first pole 12 and a second pole 14. Pole 14 has a lesser diameter than pole 12 so that it can be received within pole 12. Cam locking device 16 is disposed within pole 12 and mounted on the end of pole 14 in such a manner that by twisting one pole with respect to the other, the two poles can be either connected together at a selected overall length, or released so that their overall length can be adjusted.

Figure 5:
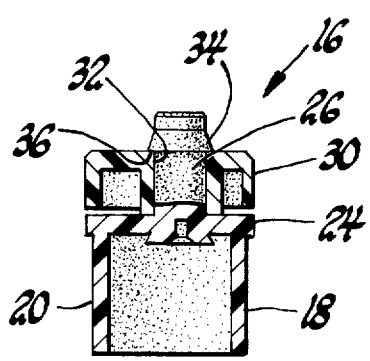
FIG. 5 is a longitudinal sectional view illustrating the preferred cam lock.
Figure 7:
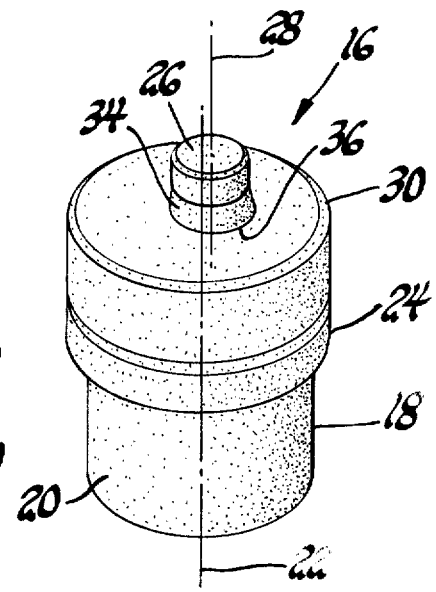
FIG. 7 is a perspective view showing the preferred cam lock.

Referring to FIGS. 5 and 7, cam locking device 16 comprises a body 18 formed of an appropriate plastic material. Body 18 has a cylindrical wall 20 formed about an axis 22. Wall 20 has a diameter chosen to be received within pole 14 in a tight fitting connection. An annular rib 24 carried at the upper end of wall 20 engages the extreme end of pole 14.

An elongated spindle 26 is integrally mounted on body 18. The spindle has a longitudinal axis 28 which, as best shown in FIG. 7, is spaced from and parallel to the longitudinal axis of wall 20.

A cam 30 is rotatably mounted on spindle 26 by means of a spindle-receiving opening 32. Cam 30 has a cylindrical wall with a diameter corresponding to the diameter of rib 24. The axis of spindle-receiving opening 32 is also spaced from the axis 22 of cam wall 20.

As best shown in FIG. 5, spindle 26 has a tapered portion 34 forming a shoulder 36 which abuts cam 30 to prevent its removal from the spindle.

Figure 6:
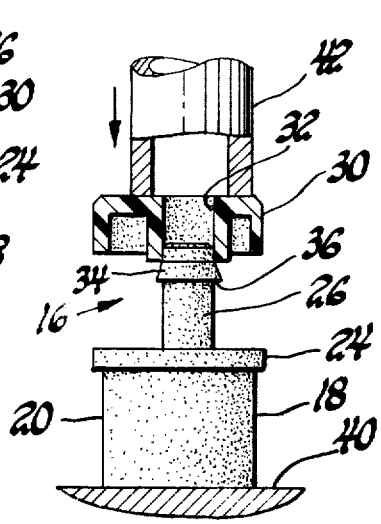
FIG. 6 is a view illustrating the method in which the cam is mounted on the spindle.

The preferred cam locking device is assembled, as illustrated in FIG. 6, by mounting body 20 on an appropriate work surface 40 with the spindle in an upright position. Cam 30 is then disposed with the spindle-receiving opening seated on the tapered portion of shoulder 36. The spindle-receiving opening is slightly circumferentially expandable so that by applying an appropriate force on the cam toward body 20, the spindle-receiving opening can be passed along the spindle toward the body. Preferably an appropriate press means 42 engages the cam 30 to move it toward the body in such a manner that the cam passes over shoulder 36 in a snapping motion.

Now referring to FIG. 1, it can be seen that cam 30 is eccentrically mounted on body 20, in such a manner, that when rotated with respect to body 20, the sidewall of the cam extends laterally beyond rib 24. In use, body 20 is received in the end of pole 14. The cam locking device is then passed inside of pole 16 in such a manner that the cam is engageable with pole 12. By twisting pole 14 with respect to pole 16 in one direction, the cam becomes wedged between pole 16 and spindle 26 to form a locking connection between the two poles preventing longitudinal motion of one pole with respect to the other. By twisting the poles in the opposite direction, the cam can be released to allow one pole to be displaced longitudinally with respect to the other.

Figure 3:
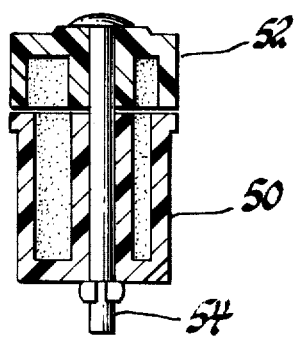
FIG. 3 and FIG. 4 are illustrations of the prior art.

FIG. 3 illustrates the prior art as comprising a body member 50 similar to body 20 of the preferred embodiment. A cam 52, similar to cam 30 of the preferred embodiment is mounted on body 50 so as to be rotatable about a metal fastener 54 that allows cam 50 to be eccentrically displaced with respect to body 50 to lock a pair of poles together.

Figure 4:
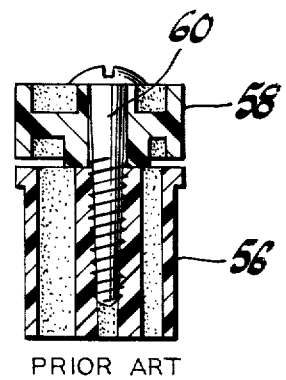

FIG. 4 shows still another version of the prior art in which a body 56 is connected to cam 58 by means of a threaded metal fastener 60 that allows cam 58 to be rotatably mounted with respect to body 56. It is to be noted that in both cases of the prior art, the fastener is of metal which tends to corrode when exposed to certain chemicals such as are used in swimming pools. In addition, the means for assembling such prior art is more involved than the snapping motion in which the cam 30 of the preferred embodiment is mounted on spindle 26.

Having described my invention, I claim:

1. A method for making a cam lock for connecting a pole of a first diameter to a pole of a second, larger diameter, comprising the steps of:

forming a first member having a body suited for being connected to the end of the first pole, the first member having a spindle mounted on the body with a longitudinal axis parallel to that of the first pole, and a shoulder carried on the spindle in a position spaced from the body;

forming a cam receivable in the second pole, the cam having an opening for receiving the spindle, the opening having a diameter less than that of the shoulder but greater than that of the spindle; and mounting the cam on the spindle by disposing the end of the spindle in the spindle-receiving opening and then moving the cam toward the body of the first member to pass the shoulder through the spindle-receiving opening to a position in which the cam is rotatably mounted on the spindle between the shoulder and said body.

2. A method as defined in claim 1, in which the shoulder forms an annular abutment about the spindle for engaging the perimeter of the spindle-receiving opening of the cam.

3. A method as defined in claim 1, in which the cam is received by the spindle with a snapping motion.

4. A method as defined in claim 1, in which the shoulder has a tapered protion engaging the cam as it is being received on the spindle.

5. A method as defined in claim 1, in which both the first member and the cam are each formed of a plastic material.

6. A method for making a two-piece cam lock for connecting a pole of a first diameter in a pole of a second, larger diameter, comprising the steps of:

forming a first member of a plastic material with a cylindrical body having an axis, the first member being suited for being connected to the first pole and having a spindle integrally mounted on the body with a longitudinal axis parallel to, but spaced from the axis of the cylindrical body, and a tapered annular shoulder carried on the spindle in a position spaced from the body;

forming a cam of a plastic material receivable in the second pole, the cam having a cylindrical sidewall and a spindle-receiving opening having an axis spaced from that of the cylindrical sidewall, the spindle-receiving opening having a diameter less than that of the annular shoulder but greater than that of the spindle; and mounting the cam on the spindle by disposing the end of the spindle in the spindle-receiving opening and then moving the cam toward the body of the first member to pass the shoulder through the spindle-receiving opening to a position in which the cam is rotatably mounted on the spindle between the shoulder and the body whereby the cam is operative to be wedged within the second pole at such time as the first pole is longitudinally twisted with respect to the second pole.

* * * * *